United States Patent [19]

Holm et al.

[11] E Patent Number: Re. 33,075

[45] Reissued Date of Patent: Oct. 3, 1989

[54] METHOD AND APPARATUS FOR DETECTING LEAKS

[75] Inventors: Albert E. Holm, Marine City; Grant A. Holm, St. Clair, both of Mich.

[73] Assignee: Testrite, Inc., Marine City, Mich.

[21] Appl. No.: 277,278

[22] Filed: Nov. 29, 1988

Related U.S. Patent Documents

Reissue of:

[64] Patent No.: 4,625,545
Issued: Dec. 2, 1986
Appl. No.: 720,037
Filed: Apr. 5, 1985

[51] Int. Cl.[4] ..... G01M 3/26

[52] U.S. Cl. ..... 73/40; 73/49.2

[58] Field of Search ..... 73/40, 49.2; 374/4

[56] References Cited

U.S. PATENT DOCUMENTS

| | | | |
|---|---|---|---|
| 2,270,505 | 1/1942 | Burleson | 73/149 |
| 2,341,138 | 2/1944 | Davis | 73/149 |
| 2,635,466 | 4/1953 | Roberts | 73/149 |
| 2,666,326 | 1/1954 | Poole et al. | 73/149 |
| 2,872,806 | 2/1959 | Mamzic | 73/40 |
| 2,874,566 | 2/1959 | Mastak | 73/40 |
| 2,924,965 | 2/1960 | Westerheim | 73/40 |
| 3,060,735 | 10/1962 | Baker | 73/149 |
| 3,074,265 | 1/1963 | Symons | 73/49.2 |
| 3,113,448 | 12/1963 | Hardway, Jr. et al. | 73/1 R |
| 3,221,539 | 12/1965 | Evans et al. | 73/45.2 |
| 3,402,602 | 9/1968 | De Coye De Castelet | 73/149 |
| 3,413,840 | 12/1968 | Basile et al. | 73/40 |
| 3,457,775 | 7/1969 | Hinderer et al. | 73/40 |
| 3,527,909 | 9/1970 | Torre | 200/83 A |
| 3,583,210 | 6/1971 | Orr | 73/49.2 |
| 3,893,332 | 7/1975 | Dolan et al. | 73/40 |
| 3,918,291 | 11/1975 | Pauly et al. | 73/40 |
| 3,921,436 | 11/1975 | Plegat | 73/40 |
| 3,987,664 | 10/1986 | Hass et al. | 73/49.8 |
| 4,047,423 | 9/1977 | Eason | 73/49.8 |
| 4,154,098 | 5/1979 | Pelletier | 73/149 |
| 4,272,985 | 6/1981 | Rapson, Jr. et al. | 73/49.1 |
| 4,441,357 | 4/1984 | Kahn et al. | 73/40 |
| 4,448,065 | 5/1984 | Meurer | 73/149 |
| 4,532,795 | 8/1985 | Brayman et al. | 73/40 |

FOREIGN PATENT DOCUMENTS

| | | |
|---|---|---|
| 393595 | 12/1973 | U.S.S.R. . |
| 1372780 | 11/1974 | United Kingdom . |
| 1442195 | 7/1976 | United Kingdom . |

*Primary Examiner*—Hezron E. Williams
*Attorney, Agent, or Firm*—Ralph M. Burton

[57] ABSTRACT

A method and apparatus for detecting leaks in a test chamber utilizing pressurization of the chamber with a gas, compares the rate of change of the gas pressure in the test chamber with the rate of change of the temperature of that chamber with the difference in such rates of change being read as a function of test chamber leakage.

14 Claims, 4 Drawing Sheets

METHOD AND APPARATUS FOR DETECTING LEAKS

Matter enclosed in heavy brackets [ ] appears in the original patent but forms no part of this reissue specification; matter printed in italics indicates the additions made by reissue.

FIELD OF INVENTION

This invention relates to leak detection by comparing the rate of change of gas pressure in the test chamber with the rate of change of the temperature of that chamber and reading the difference in such rates of change as a function of leakage of the test chamber.

BACKGROUND OF INVENTION

In the manufacture of internal combustion engine cylinder blocks, automotive heat exchangers, such as radiators or heater cores, or automobile fuel tanks and the like, it has long been necessary to test the same for leaks before approving them for use. Various approaches have been taken to this leak testing, some of which are shown in the following U.S. Pat. Nos.:

2,874,566
3,221,539
3,457,775
3,893,332
4,047,423

Despite these and other prior efforts, the need remains for leak detection which may be carried out in but a few seconds.

Heretofore leak testing using air as a testing medium required anywhere from 5 to 12 seconds for the air temperature in the test chamber being tested to stabilize before the leak test was effected. Without this stabilization, temperature changes of the air in the chamber being tested would give a false reading. Such temperature changes could result from the adiabatic cooling effect of compressed air expanding as it is released into the chamber, or, if the chamber walls were cooler or warmer than the air introduced into the chamber, heat transfers and consequent pressure changes would occur. With the requirement to increase production so that more parts could be tested in a given period of time, there has been the concurrent need to reduce the stabilization time.

Also, serious errors in leak detection based on the use of air as a test medium could arise in the production environment of a large manufacturing plant as a result of diurnal temperature variations which, in some instances, may be as much as 20° F. in a 12-hour period. With this kind of variation, even a test taking less than one minute may permit a sufficiently significant temperature change in the test chamber to render wholly inaccurate a leak test based on air pressure change. Thus, there has been a need to neutralize these diurnal temperature effects which would cause changes in the temperature of the chamber being tested and distort the efficacy of the leak test.

Another error which can distort the accuracy of prior art leak testers may arise from the lack of uniformity of temperature of the parts being tested. For example, parts which have been waiting for some hours at room temperature to be leak tested might be cooler than parts coming directly from a parts washer, and yet if this temperature difference is not compensated for, there will be inaccuracies in the test results, viz., those parts which are warmer will tend initially to heat the air to the part temperature, and thereafter when the test is being performed the air will be cooling as the part cools and create a pressure drop simulating a leak when a leak may not, in fact, exist. Thus, the need to compensate for such errors has been an important problem to be solved in arriving at a satisfactory leak tester.

Because of the difficulties of leak testing structures, such as automobile radiators or fuel tanks, and occasionally engine blocks using air as a test medium, such products are often tested in large waterbath type testing machines relying on visual detection of air bubbles to signal leaks. As such a method is slow and relies on human eyesight, a faster and more reliable method has been needed for some time.

In our copending application filed Feb. 13, 1984, Ser. No. 579,701, we disclose a method and apparatus for leak testing a chamber wherein the gas pressure in the test chamber is compared with the gas pressure in a reference chamber, and the rate of change of the pressure difference is read as a function of leakage of the test chamber. The reference chamber is exposed to the same temperature effects as those in the test chamber, preferably by either forming the reference chamber as an adjunt of the part containing the test chamber, or by exposing the reference chamber directly to the gas in the test chamber. While this approach works satisfactorily in many instances, in others it is difficult or impossible to expose a reference chamber to the same temperature effects as the test chamber, and thus, in such instances this method is not feasible.

SUMMARY OF THE INVENTION

Our invention overcomes the aforementioned difficulties while nevertheless utilizing a fluid that is thermally sensitive, such as air, by neutralizing the effect of pressure changes occurring as a result of temperature changes of the air in the chamber being tested (hereinafter termed the "test chamber"). We accomplish this by sensing the infrared radiation of the test chamber and comparing the rate of change thereof with the rate of pressure change of a gas, such as air, delivered to the test chamber. If the rate of pressure change in the chamber is greater than the rate of change of the infrared radiation by more than a given amount, such indicates that the chamber is leaking. We sense the infrared radiation without actual physical contact with the test chamber, which thereby avoids the problem associated with the method of our aforesaid copending application where the configuration of some parts do not lend themselves to the use of a reference chamber which can be exposed to the same temperature effects as the test chamber. As a result of this method, we are able to reduce substantially stabilization time, and temperature of the test chamber, as well as ambient temperatures, are taken into account or compensated for during the test.

BRIEF DESCRIPTION OF PREFERRED EMBODIMENTS

Figure 1:
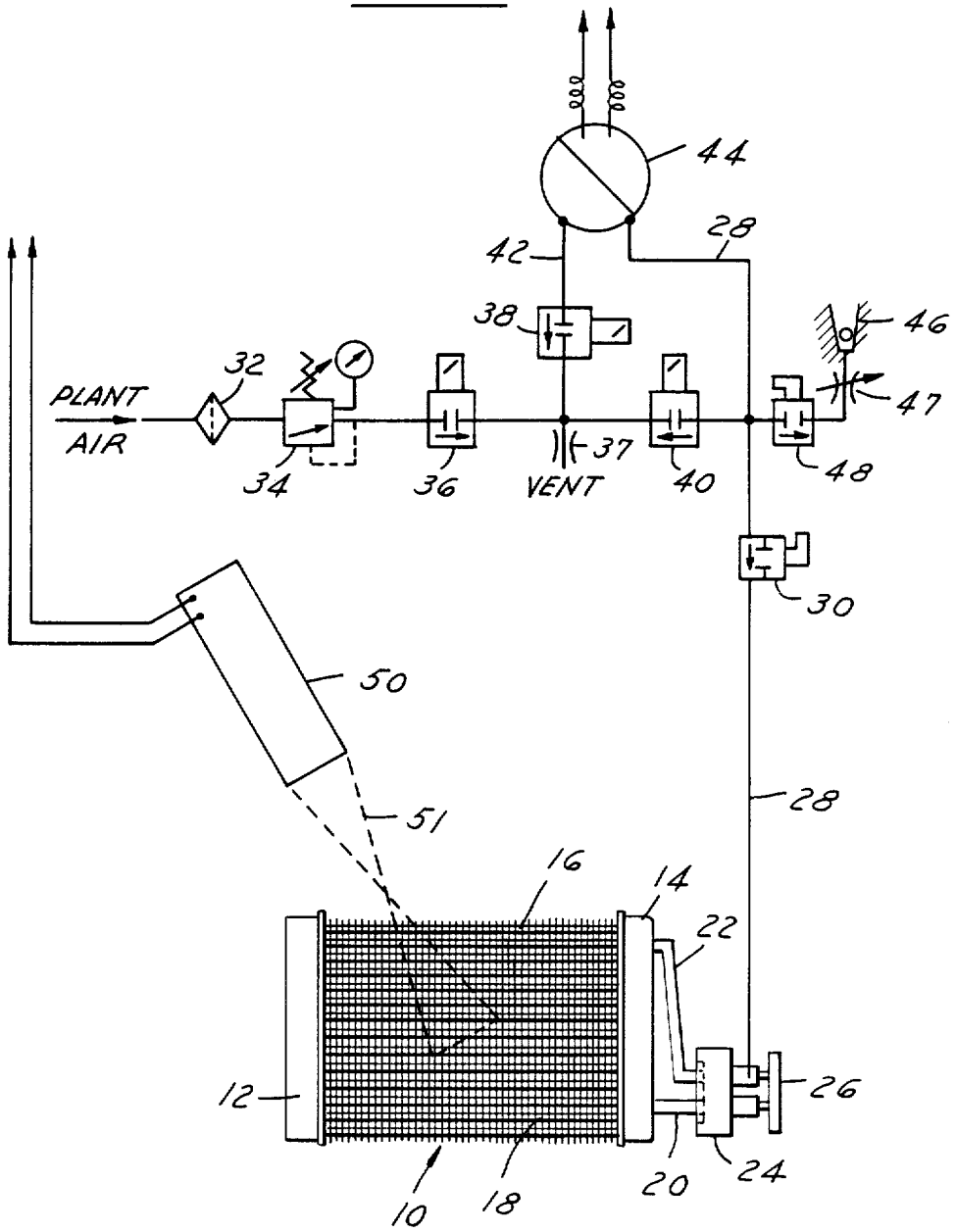
FIG. 1 is a schematic drawing of a portion of the apparatus embodying our leak detector.

Referring to FIG. 1, an automobile heat exchanger, such as a heater core, is shown at 10, having a pair of headers 12 and 14 between which extend cooling tubes 16 having radiating fins 18. Hereinafter the heater core, which is merely exemplary of a device which may be tested by our invention, is occasionally referred to as the "test chamber". A pair of hook-up pipes 20 and 22 extend from header 14 and are normally used to connect the core into the heater, one pipe serving as an inlet and the other as an outlet.

The purpose of our invention is to determine the integrity of this heater core and its pipes 20 and 22 rapidly and accurately. While we have shown the apparatus and circuitry schematically, such will enable those skilled in the art to utilize our invention in essentially automated equipment in a production line environment in a manufacturing or assembly plant.

The leak detector includes a releasable connector 24 intended to be sealingly fastened to the pipes 20 and 22. For this purpose the heat exchanger may be placed in a suitable test station on a suitable support, not shown, and the connector 24 is then manually or automatically plugged over the ends of the pipes to be held there by a clamping device 26. In the embodiment shown, the end of pipe 22 will be plugged by the connector against the displacement of air into or therefrom, while the end of pipe 20 will be placed in communication with test air line 28 on the downstream side of isolation (ON/OFF) valve 30.

A source of compressed air termed "plant air" is delivered to the leak detector through a filter 32, a pressure regulator 34 and a solenoid valve 36. Air from valve 36 is delivered to the leak detector circuit by way of a vent orifice 37 and a pair of solenoid valves 38 and 40. Valve 38 controls communication with air line 42 which is connected to one side of the differential pressure cell 44. Solenoid valve 40 controls communication with the test air line 28 on the other side of the differential pressure cell 44. A suitable pressure cell is manufactured by the Foxboro Company of Foxboro, Mass., U.S.A., under Model No. 823. This provides an analogue output voltage which varies in accordance with the pressure differential between the lines 42 and 28. A flow meter 46 having a flow control valve 47 is connected to the circuit through a control valve 48 and is for the purposes of calibrating the system.

An infrared sensor 50 of the type which will measure infrared radiation of the test chamber 10 without physical contact therewith is arranged to be focused on the test chamber. This type of sensor is particularly advantageous in accommodating test chambers in parts moving through a test station, particularly parts which do not adapt themselves to the juxtaposition of a reference chamber as required in our aforesaid copending application. A suitable sensor of the type we have found satisfactory is manufactured by Mikron Instruments Co., Inc., P.O. Box 211, Ridgewood, N.J. 07451, under the designation "The Micron 67 Infraducer". This is a self-contained transducer/transmitter that provides a linear 4–20 maA output which is passed through a resistor to ground to provide an analogue voltage that varies with the sensed infrared radiation. The optical system in the infrared sensor is focused as at 51 at an angle to the fins 18 of the heat exchanger.

Figure 2:
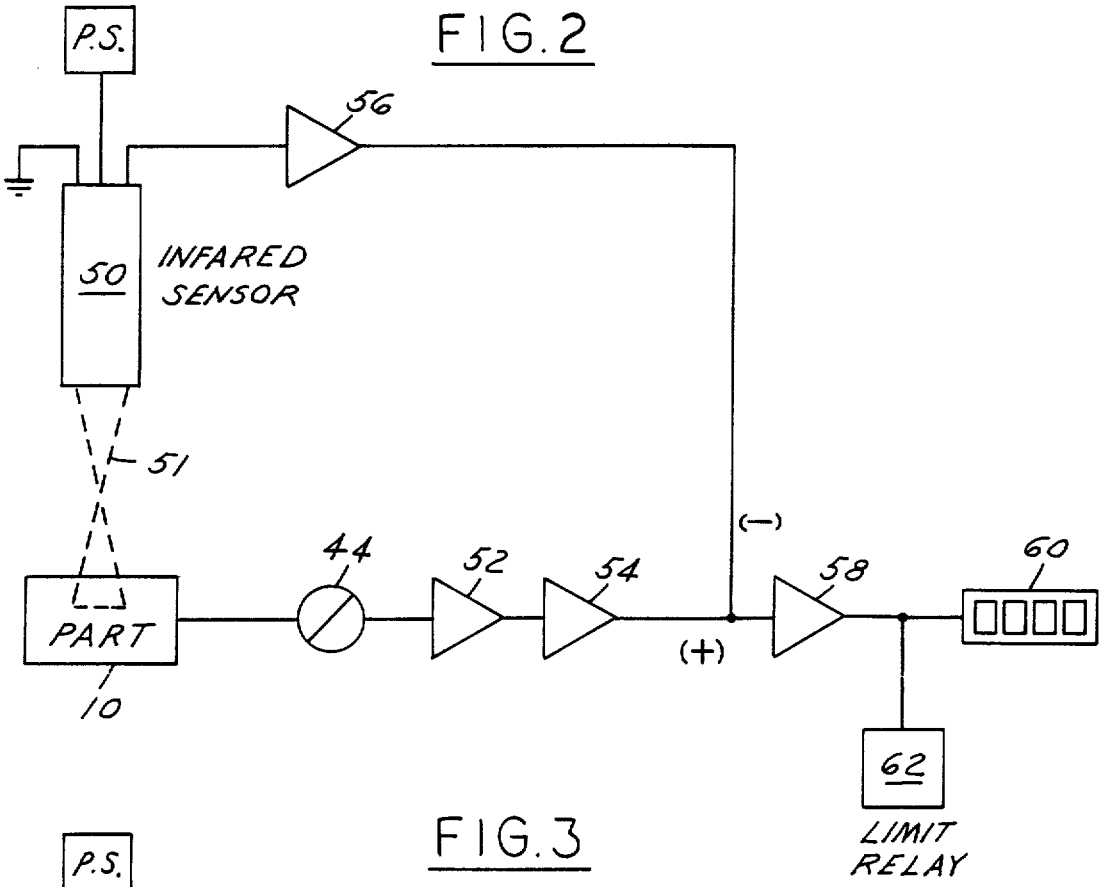
FIG. 2 is a block diagram of a preferred embodiment of our leak detector.

Referring to FIG. 2, where we have shown in a schematic block diagram the preferred embodiment of the invention, the net voltage output of the differential cell 44 is applied to the input terminal of the preamplifier 52 which establishes a mathematical relationship between the volumetric rate of air leakage and the ultimate display on the voltmeter 60. The voltage output of the preamplifier is delivered to a zeroing amplifier 54 having a voltage slope gain control whose output is connected to the input of an amplifier 58 which provides an output delivered to the digital voltmeter 60 causing it to read in terms of engineering units such as CCs per minute, cubic inches per minute, etc.

The infrared sensor 50 is connected to a power supply P.S. and has its output delivered to a zeroing amplifier 50 having a voltage slope gain control, and its output is connected to the same input pin of the amplifier 58 as that from zeroing amplifier 54. Thus, by adjusting the zeroing amplifiers 54 and 56, the voltages fed together from the infrared sensor circuit and the pressure transducer circuit are registering only changes in pressure and temperature of the test chamber. The voltages are arranged in this embodiment to be equal but opposite and of equal slope when there is no leakage from the test chamber.

In implementing the invention, the signal generated by the pressure cell 44 has its amplitude adjusted by the preamplifier 52 so that the slope of the voltage change with pressure will substantially correspond to the slope of the voltage change from the infrared sensor 50. The output of the preamplifier is delivered to the zero amplifier 54 where the output voltage is reduced to zero so that at the time of the test the only signal shown by the zeroing amplifier 54 will be an indication of pressure change. Meanwhile, the infrared sensor generates a voltage signal which is delivered to a zeroing amplifier 56 and the output voltage thereof is adjusted to zero so that at the time of the [rest] *test* the signal produced only reflects the varying temperature of the test chamber. The two voltages in the preferred embodiment are made of opposite polarity but equal magnitude so that for a no-leak chamber the changes are algebraically summed and self-cancelling. For a leaking chamber, the pressure change is indicated by the net difference between the two signals. The output of the amplifier 58 is directed to a decision making relay and the meter 60.

In carrying out a test, after filling the system with pressurized air, solenoid valves 38 and 40 are closed and the system is allowed to stabilize for a few seconds. Typically, this may be require between four to seven seconds. At this point, if there is no leakage at the test chamber, the output of the amplifier 58 as shown by the voltmeter 60 will register substantially 0-0-0 or within an allowable departure thereof. If, on the other hand, there should be a leak of air from the test chamber, the voltage appearing at the input to the amplifier 58 from the zeroing amplifier 54 will not be totally cancelled by the voltage from the zeroing amplifier 56 so that the voltmeter 60 will read a leak.

If during the test, the test chamber was cooling, this would reflect in increasing positive voltage from the cell 44, while from the infrared sensor the voltage would be increasingly more negative. If the slopes of these two voltages as seen at the outputs of the amplifiers 54 and 56 were substantially equal, then the algebraic sum would remain essentially constant, indicating on the voltmeter 60 that the test chamber was not leaking. On the other hand, if the chamber were leaking, the slop of the voltage change from the zeroing amplifier 54 would be steeper and this would cause a net positive change in the input to the amplifier 58 and consequently an output to the voltmeter 60 indicating a leak in the chamber.

Also shown in FIG. 2 is a limit relay 62 which may sound an alarm or other signal or initiate some further function if the voltage output of the amplifier 58 indicates either that the chamber is leaking or that it is within acceptable limits.

Figure 3:
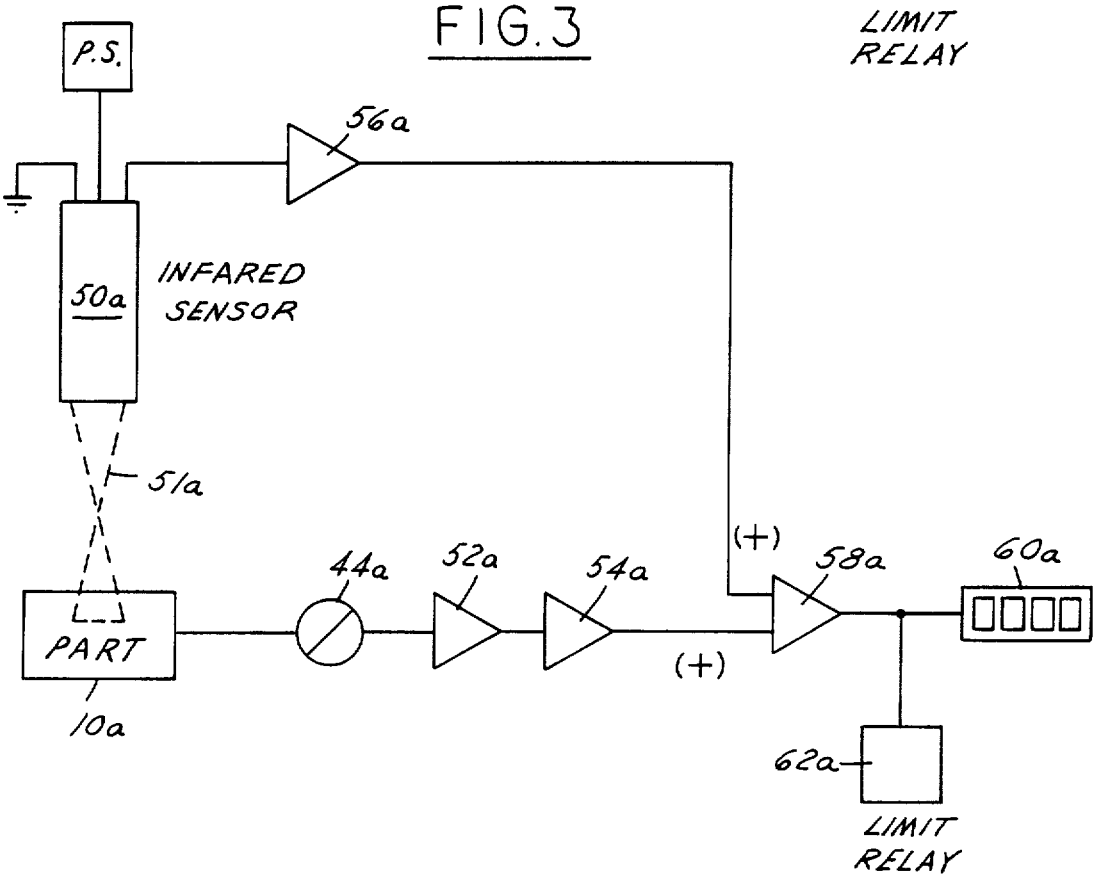
FIG. 3 is a block diagram of an alternative embodiment of our leak detector.

In FIG. 3 we have used reference numerals corresponding to those in FIG. 2, differing only in an alphabetic suffix to indicate like parts. We have shown an alternative embodiment in FIG. 3 wherein the output of amplifier 56a is positive and fed into an amplifier which may be the same as 58 in FIG. 2 but functions in FIG. 3 as a differential input amplifier 58a. The output of the zeroing amplifier 54a is fed directly into the amplifier 58a and is arranged to be positive. The zeroing amplifiers 56a are adjusted so that the voltage slopes delivered to amplifier 58a are equal when the test chamber is not leaking. If, then, the chamber in part 10A leaks, the voltage slope delivered from 54a to the amplifier 58a will be steeper. At the same time, if the temperature of part 10A is higher and cooling faster, the voltage slope from 56a to the amplifier 58a will be steeper. Thus, in FIG. 3 the output of the differential amplifier 58a is the difference of the voltages rather than in FIG. 2 the algebraic sum thereof. But with either embodiment, comparing the slopes of the voltages changes is the important characteristic from which the decision is made whether the test chamber is leaking or is tight. If the slopes are the same, the chamber is tight, while if they differ, a leak may be suspected.

Figure 4A:
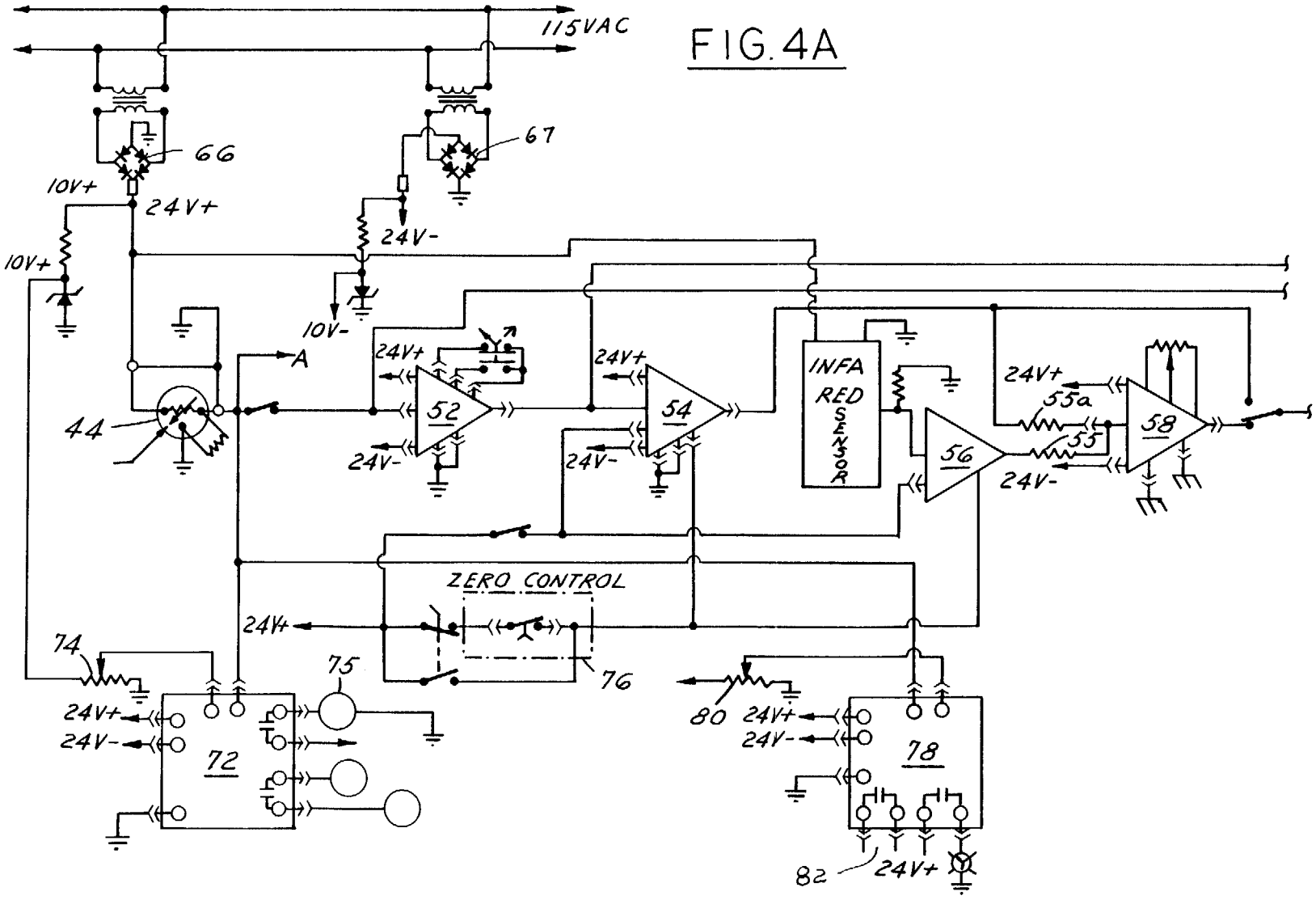
FIGS. 4A and 4B comprise an electric schematic of the preferred form of our leak detector.
Figure 4B:
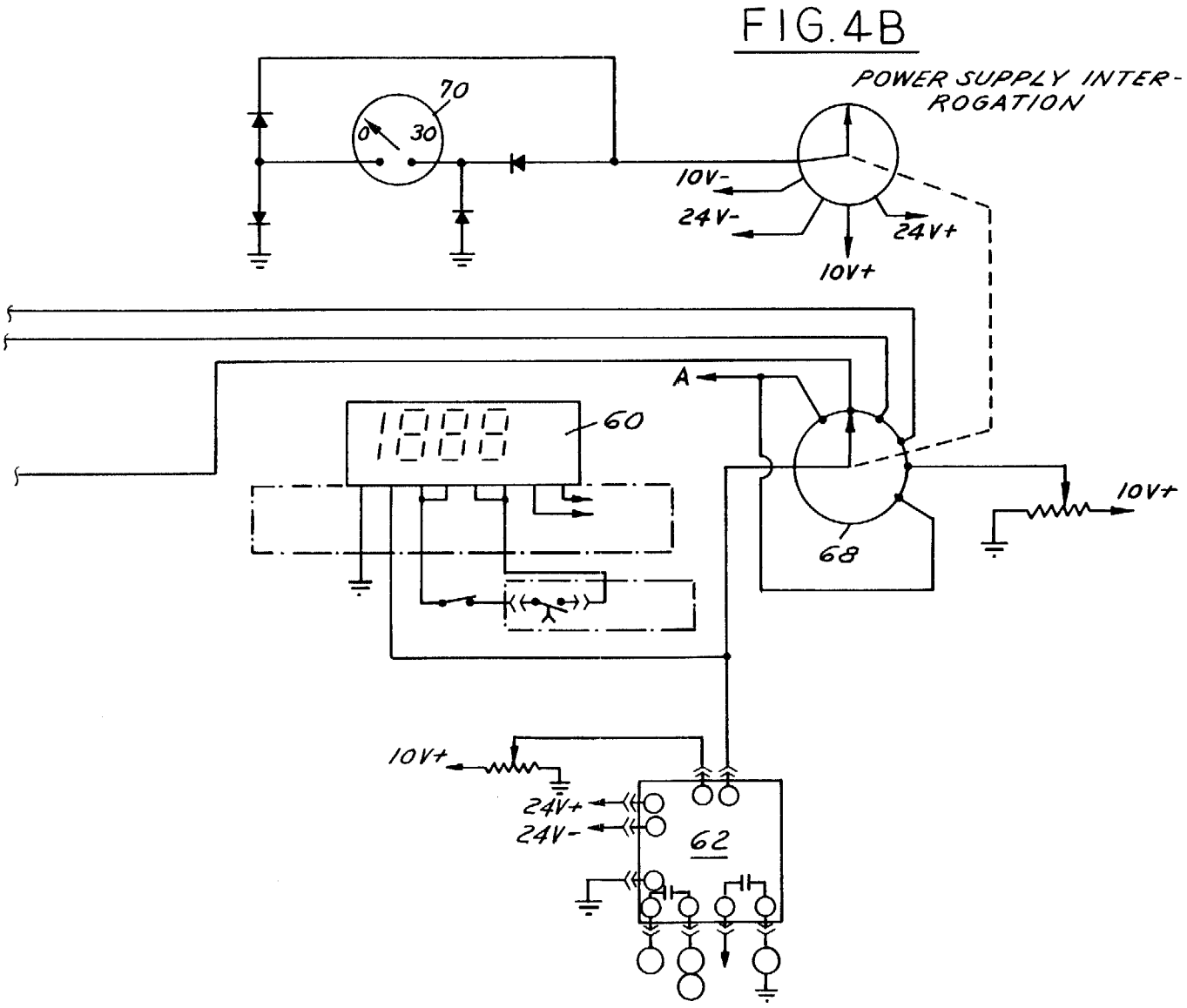

Referring now to FIGS. 4 and 4A, where additional detail of the circuit of FIG. 2 is shown, positive and negative 24-volt DC power supplies 66 and 67 deliver voltages to the various circuit components. The preamplifiers 52 and 56 may be of any suitable type, though we have satisfactorily used ATC (Automatic Timing and Controls Co., King of Prussia, Pa. 19406, U.S.A.) Model No. 65012700500 for this purpose. Zeroing amplifiers may be ATC Model No. 65012705600 and the amplifier 58 which may be used both as a differential amplifier in FIG. 3 or to provide an algebraic sum as in FIG. 2, may be an ATC 65012700500. The digital voltmeter 60 may be a Data Tech No. 5313, while the limit relay 62 may be an ATC 65012700900.

To provide for power supply interrogation through meter 70, as well as read voltages at various points in the circuit through the meter 60, a rotary switch 68 may be provided as shown.

Means are provided to indicate a gross leak in the test chamber, which might be caused by an improperly connected line 28 to the chamber, or a test chamber with a gross defect in it. Such means comprises a relay 72 which may be an ATC 65012700900. It is connected to the output of cell 44. When the voltage output of the cell rises a preset amount, as determined by comparing such voltage with a set point potentiometer 74, the relay will trip, and signal an alarm 75 or control other functions as desired, so that testing of the part is discontinued.

A zero control circuit 76 for the zeroing amplifiers 54 and 56 is provided. By activating the zeroing circuit, the outputs of the amplifiers are forced to read zero or allowed to pass through any subsequent change when the control circuit is opened.

Resistors 55 and 55a are provided in the outputs of amplifiers 54 and 56 to limit the currents that may be permitted in the circuits between the amplifiers 54, 56 and 58.

Relay 78 is provided to detect a fault or internal leak in the system. It has an input connected to the output of the pressure cell 44, but is set by its potentiometer 80 to read a negative voltage which could result from an internal air pressure leak in line 42, in which event the relay will trip a circuit 82 to signal that the test should be aborted or otherwise initiate action at the testing station.

Our copending application, Ser. No. 579,701, filed Feb. 13, 1984, is incorporated herein by reference, in particular FIG. 4 thereof, to illustrate an operable circuit for controlling the valves and zeroing functions of the leak detector.

By sensing the infrared radiation of the test chamber we are able to develop a signal which will vary essentially instantaneously with temperature changes in the test chamber and therefore are able to test for chamber leakage without the necessity of waiting for temperature stabilization of the test chamber part from either processing variables, the adiabatic heat effect from the admission of compressed air, or diurnal environmental temperature changes.

What is claimed is:

1. The method of quickly determining leakage of a test chamber in a production environment comprising the steps of:

applying gas pressure to the test chamber and generating a signal whose slope varies with the rate of change of the pressure;

sensing the infrared radiation from the test chamber and generating a signal whose slope varies with the rate of change of the radiation; and comparing the slopes of the two signals and reading a divergence therebetween as a function of chamber leakage.

2. The invention defined by claim 1 wherein one of the generated signals is of opposite polarity to the other generated signal and before testing a chamber for leakage one of the generated signals is adjusted to be equal but of opposite polarity to the other generated signal for a non-leaking test chamber, and thereafter during a test algebraically adding the signals and reading a departure from zero as a measure of chamber leakage.

3. The method defined by claim 1 wherein the radiation generated signal is of the same polarity as the pressure generated signal and before testing a chamber for leakage at least one of the generated signals is adjusted to be equal to the other generated signal for a non-leaking test chamber, and thereafter during testing reading the difference between the signals as a function of chamber leakage.

4. The invention defined by either claim 2 or 3 wherein a pressure generated signal indicative of no pressure being held in the test chamber is read as a gross leak of the test chamber aborting the test.

5. The invention defined by claim 1 including the step of first adjusting the slopes of the generated signals so that the slopes are substantially equal when the test chamber is non-leaking, and thereafter reading a divergence in slopes as a function of chamber leakage.

6. Apparatus for detecting leaks in a test chamber comprising, in combination:

means for applying a gas pressure to the test chamber;

means for generating a signal whose slope varies as the pressure change of the gas in the test chamber;

means for sensing the infrared radiation of the test chamber;

means for generating a signal whose slope varies as the rate of radiation of the test chamber; and means for comparing the respective signals and reading a divergence of their slopes as a function of chamber leakage.

7. The invention defined by claim 6 wherein the means for generating the signals generates signals of opposite polarity and for a non-leaking test chamber of equal magnitude.

8. The invention defined by claim 6 wherein the means for generating the signals generates signals of the same polarity and of equal magnitude for a non-leaking chamber.

9. The invention defined by claim 6 wherein means are provided for adjusting the generated signals so that for a non-leaking test chamber the slopes of the signals are substantially equal.

10. The invention defined by claim 6 wherein means are provided responsive to a pressure generated signal indicative of a no-pressure condition in the test chamber for indicating a gross leak.

*11. A method of quickly determining leakage of a succession of parts being manufactured in a production environment comprising the steps of:*

*a. temporarily attaching a releasible connector successively to each part to sealingly define a test chamber at least partially bounded by the part;*

*b. applying gas pressure to the test chamber;*

*c. generating a pressure signal representative of the pressure in the test chamber;*

*d. remotely sensing the infrared radiation from a surface of the part and generating a radiation signal representative of the radiation;*

*e. comparing the two signals at at least two points in time to determine chamber leakage; and*

*f. disconnecting the releasible connector from the part.*

*12. The method of claim 11 wherein the comparison between the two signals is made by registering the relationship between the two signals at a first point in time and reading a variation in the relationship at a subsequent time as a function of chamber leakage.*

*13. An apparatus for quickly determining leaks in a succession of parts being manufactured in a production environment comprising:*

*a. releasible connector means for sealing connection to each part to define a test chamber at least partially bound by the part;*

*b. means for applying gas pressure to the test chamber;*

*c. means for generating a pressure signal representative of the pressure of the gas in the test chamber;*

*d. means for sensing the infrared radiation of a surface of the part;*

*e. means for generating a radiation signal representative of the radiation of the part; and*

*f. means for comparing the two signals at at least two points in time to determine chamber leakage.*

*14. The apparatus of claim 13 wherein the means for comparing the two signals includes means for registering the relationship between the two signals at a first point in time and for reading a variation in the relationship at a subsequent time as a function of chamber leakage.*

* * * * *